(12) United States Patent
Pantfoerder

(10) Patent No.: US 8,805,302 B2
(45) Date of Patent: Aug. 12, 2014

(54) PROXIMITY AND AMBIENT LIGHT SENSOR WITH IMPROVED SMUDGE REJECTION

(75) Inventor: Achim Pantfoerder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 13/111,910

(22) Filed: May 19, 2011

(65) Prior Publication Data

US 2012/0295665 A1    Nov. 22, 2012

(51) Int. Cl.
*H04B 1/38* (2006.01)

(52) U.S. Cl.
USPC ............... 455/90.3; 455/575.8; 455/67.11

(58) Field of Classification Search
USPC .......... 455/566, 575.8, 90.3, 95; 345/98, 173, 345/156, 175; 348/340, 374, 164; 250/227.22, 227.11, 221, 227.24, 250/339.05, 201.1
See application file for complete search history.

(56) References Cited

U.S. PATENT DOCUMENTS

| | | | | |
|---|---|---|---|---|
| 6,087,653 | A * | 7/2000 | Van Schyndel et al. | 250/227.11 |
| 6,246,862 | B1 * | 6/2001 | Grivas et al. | 455/566 |
| 6,835,923 | B2 * | 12/2004 | Hamalainen et al. | 250/227.11 |
| 7,355,164 | B2 * | 4/2008 | Arnold | 250/227.22 |
| 8,507,863 | B2 | 8/2013 | Holenarsipur | |
| 2006/0016994 | A1 | 1/2006 | Basoor et al. | |
| 2006/0164241 | A1 * | 7/2006 | Makela et al. | 340/556 |
| 2007/0075956 | A1 * | 4/2007 | Satou et al. | 345/98 |
| 2007/0075965 | A1 | 4/2007 | Huppi et al. | |
| 2007/0285555 | A1 * | 12/2007 | Chen | 348/340 |
| 2008/0006762 | A1 * | 1/2008 | Fadell et al. | 250/201.1 |
| 2008/0158173 | A1 * | 7/2008 | Hamblin et al. | 345/173 |
| 2008/0167834 | A1 * | 7/2008 | Herz et al. | 702/150 |
| 2009/0159900 | A1 * | 6/2009 | Basoor et al. | 257/82 |
| 2010/0102230 | A1 * | 4/2010 | Chang et al. | 250/338.4 |
| 2010/0207879 | A1 * | 8/2010 | Fadell et al. | 345/156 |
| 2012/0129580 | A1 | 5/2012 | Tam | |
| 2012/0295665 | A1 | 11/2012 | Pantfoerder | |
| 2013/0147965 | A1 * | 6/2013 | Gao et al. | 348/164 |

FOREIGN PATENT DOCUMENTS

| | | |
|---|---|---|
| KR | 20090096196 | 9/2009 |
| KR | 20100038534 | 4/2010 |

OTHER PUBLICATIONS

Non-Final Office Action (dated May 6 2013), U.S. Appl. No. 12/950,187, filed Nov. 19, 2010, First Named Inventor: Ching Yu John Tam, 16 pages.

\* cited by examiner

*Primary Examiner* — April G Gonzales
(74) *Attorney, Agent, or Firm* — Blakely, Sokoloff, Taylor & Zafman LLP

(57) ABSTRACT

An integrated proximity and ambient light sensor assembly includes an emitter of an IR proximity signal, and a detector configured to detect the IR proximity signal from the emitter when the apparatus is sensing proximity, and to detect ambient light when the apparatus is sensing ambient light. The assembly includes an IR cut filter that has a film disposed over the detector that rejects IR light but passes visible light to the detector, and an opening in the film centered over a midpoint of the detector that passes IR and visible light to the detector. The opening allows IR light to reach the detector from within a narrow angle, but absorbs undesirable emitted IR light that is reflected by oily build-up or "smudge" left on a cover of the device. The film allows visible light to pass for a wider angle to better determine average ambient light.

20 Claims, 4 Drawing Sheets

PROXIMITY AND AMBIENT LIGHT SENSOR WITH IMPROVED SMUDGE REJECTION

FIELD

An embodiment of the invention is directed to an integrated proximity and ambient light sensor arrangement that has improved "smudge" rejection, and may be used in a handheld mobile communications device. Other embodiments are also described.

BACKGROUND

In the field of personal mobile devices such as laptop computers, tablet computers, and smart phones, proximity sensors are used to sense hover events. Hover events may include no touch, close proximity positioning of parts of the user's body or other objects (e.g., a stylus held by the user), near an external surface of the device. Typically, such proximity sensors are designed to detect an external object that is located outside the near field detection capability of a touch sensor (e.g., those used in a typical touch screen display such as found in an iPhone™ device by Apple Inc., of Cupertino Calif.). In one instance, the proximity sensor includes an infrared (IR) emitter and a counterpart IR detector that are controlled and sampled by proximity sensor circuitry integrated in the housing of the mobile device. Emitted infrared radiation is scattered by the external "target" object, and then detected and analyzed to infer that an external object is (or is not) close to the exterior surface of the device.

A personal mobile device may also use an ambient light sensor (ALS) to sense a brightness or intensity of ambient visible light. The ALS may include an ambient light detector that is sampled by ALS circuitry integrated in the housing of the mobile device. The ambient light level detected may be used to adjust a display brightness.

SUMMARY

Embodiments of the invention include an electronic device having an integrated proximity and ambient light sensor assembly that uses an IR emitter to emit an IR proximity signal, and a single detector to detect the IR proximity signal from the emitter (e.g., reflected by an object) when the apparatus is sensing proximity and to detect ambient light when the apparatus is sensing ambient light. An IR cut filter disposed over the detector prevents a wide view angle of IR light from reaching the detector, but passes visible light, in order to reduce sensitivity of the detector to IR light and thereby improve proximity detection. The IR cut filter allows a wide view angle of visible to reach the detector, in order to increase sensitivity of the detector to visible light and thereby improve ambient light detection.

The IR cut filter has a film disposed over the detector that reduces the detector's view angle of IR light sensitivity to that of an opening in the film, centered over a midpoint of the detector. The opening has a size that allows IR light to reach the detector only from within a smaller acceptance angle, while the film allows visible ambient light to reach the detector from a greater acceptance angle. This may allow the IR cut filter to prevent or attenuate undesired stray IR radiation (e.g., from the IR emitter) that would impinge on the detector, while allowing the desired, target reflected IR radiation to reach the detector.

The stray radiation that is attenuated may include IR rays from the emitter that have been internally reflected within a radiation passing cover that is located over the detector. These IR rays may have been internally reflected from oily build-up and residue, also referred to here as "smudge", that has formed on the exterior surface of the cover due to normal use of the device. The filter thus allows visible ambient light to be sensed over a wide angle, to provide better detection of the average ambient light, while at the same time limits IR sensing to a narrow angel for better proximity target detection. As a result, a more accurate integrated proximity and ambient light sensor may be obtained.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
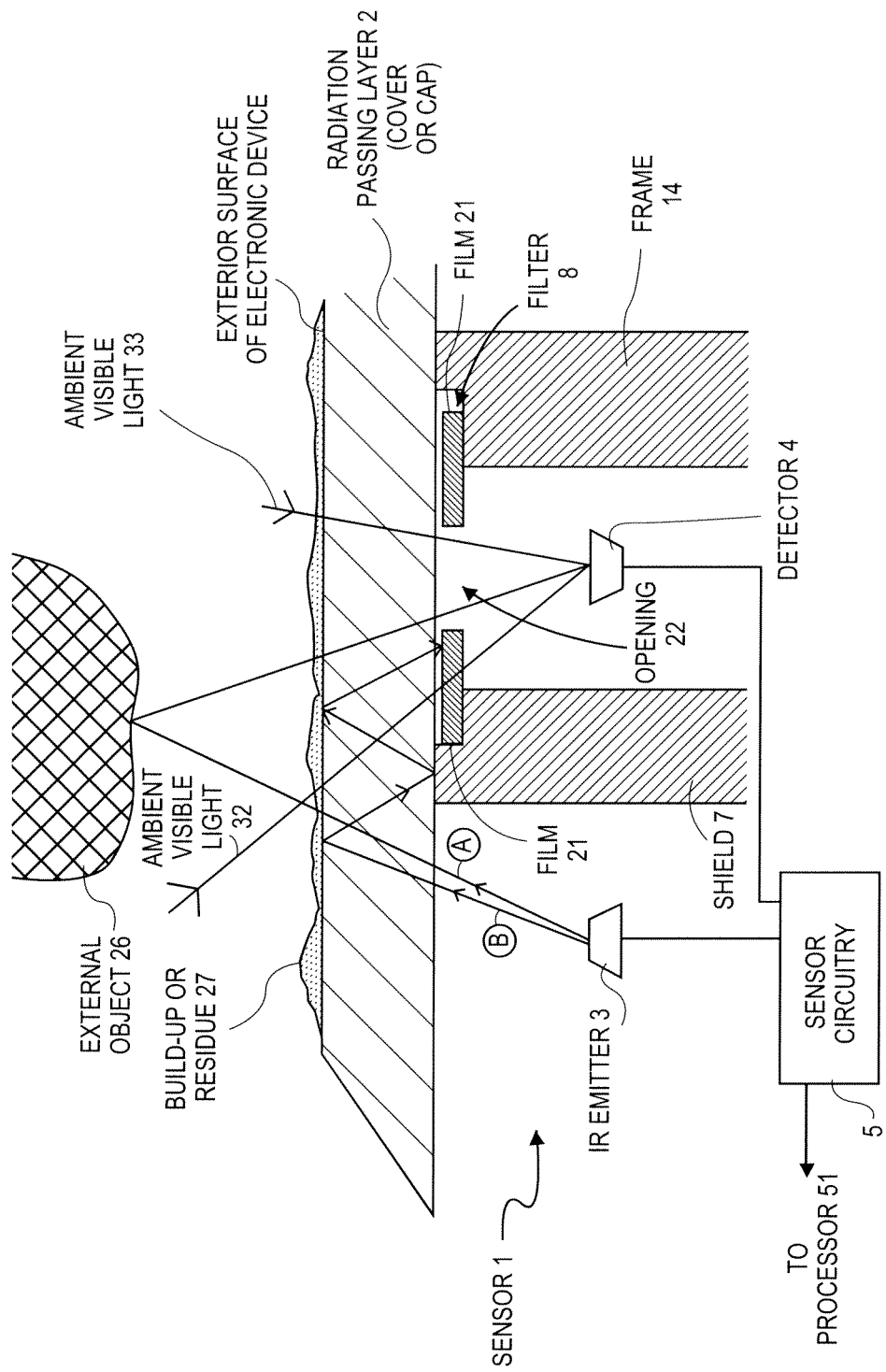
FIGS. 1A-B illustrate relevant portions of an electronic device, in accordance with an embodiment of the invention.
Figure 1B:
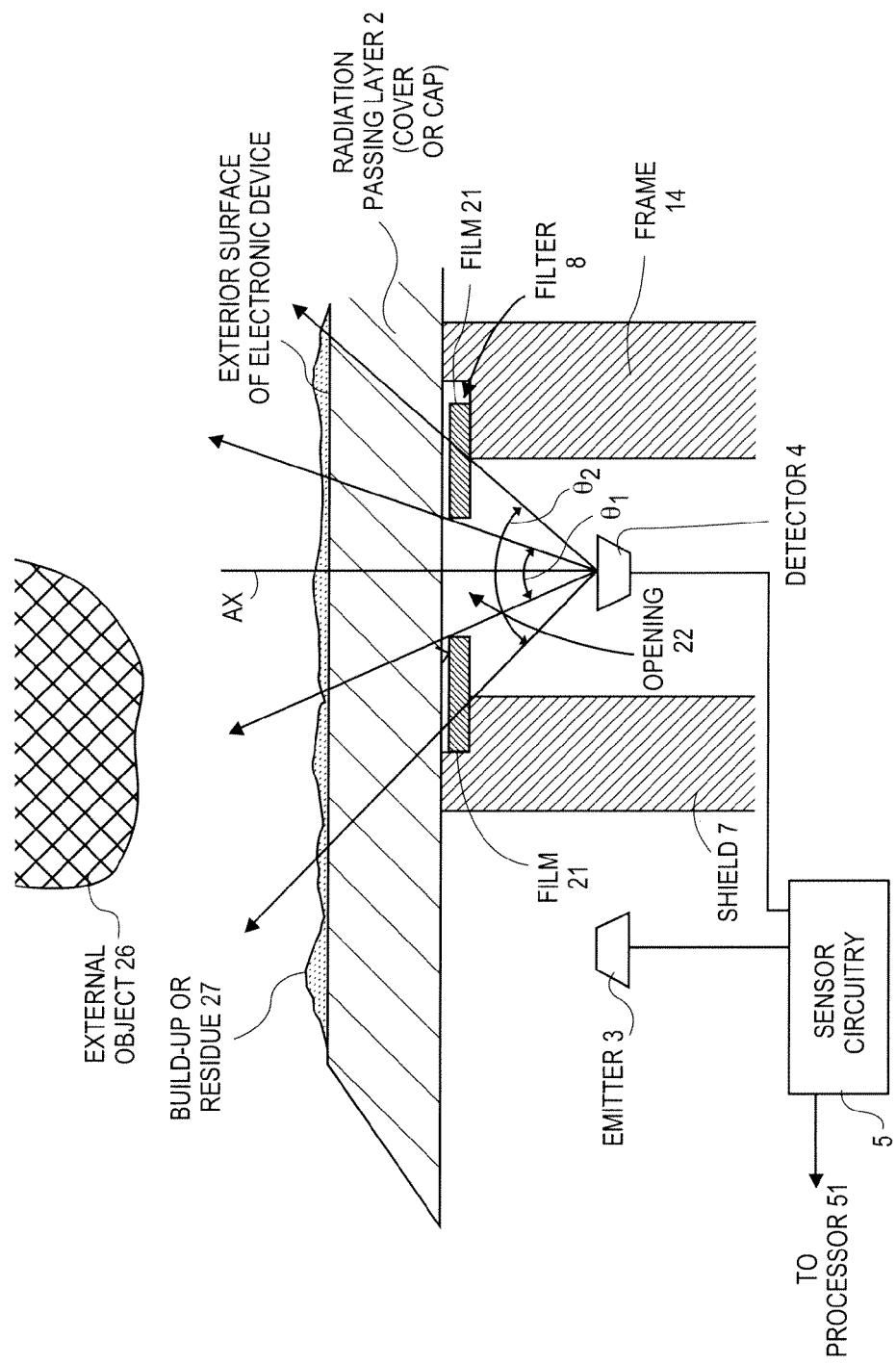

FIGS. 1A-B illustrate relevant portions of an electronic device, in accordance with an embodiment of the invention. A sectional view of the device and, in particular, a region near its exterior surface is shown that contains a radiation passage for integrated proximity and ambient light sensor 1 in the device. For instance, a personal mobile device may use a single sensor to detect ambient light as well as proximity. Such a sensor may be referred to as a "combined" or "integrated" proximity and ambient light sensor (e.g., a proximity and ALS sensor). The sensor may be configured to use a detector to detect the IR proximity signal emitted by a proximity emitter of the device (e.g., and reflected by an object) when the apparatus is sensing proximity, and to use the same detector to detect ambient light intensity when the apparatus is sensing ambient light.

A personal mobile device may use sensor 1 for proximity detection to infer that a part of the user's body or another external object is (or is not) close to the exterior surface of the device, such as to determine whether the mobile device should take an action. The mobile device may also use sensor 1 for detecting an intensity of ambient light. In some cases, the ambient light detected may also be used to infer close proximity positioning of a part of the user's body or other objects. For instance, determining whether an object is sufficiently close to take action may include sensing a decrease in ambient light corresponding to an increase in closeness of proximity at sensor 1.

The integrated sensor may be located near an acoustic aperture for an earpiece speaker (receiver) of the device, and may at least be used to determine when the handset is being held close to the user's ear, as opposed to away from the ear. When the sensor indicates that the external object, in this case, the user's ear or head, is sufficiently close, then a predetermined action is taken, including, for example, turning off a touch screen display or disabling processing of inputs of a touch screen display that is on the same external face of the housing as the acoustic aperture. Amongst other things, this design may avoid unintended touch events caused by the user's cheek, while the handset is held close to the user's ear during a call. In some cases, an opposite predetermined action may be taken when the sensor indicates that the object is not sufficiently close (e.g., is farther away). The integrated sensor may perform these tasks better than separate proximity and ALS sensors. For example, using a single detector may more accurately determine that an object is sufficiently close to take action, by sensing a decrease in ambient light intensity corresponding to an increase in closeness of an object, at a single location (e.g., both detections made by and at the single detector).

Figure 3:
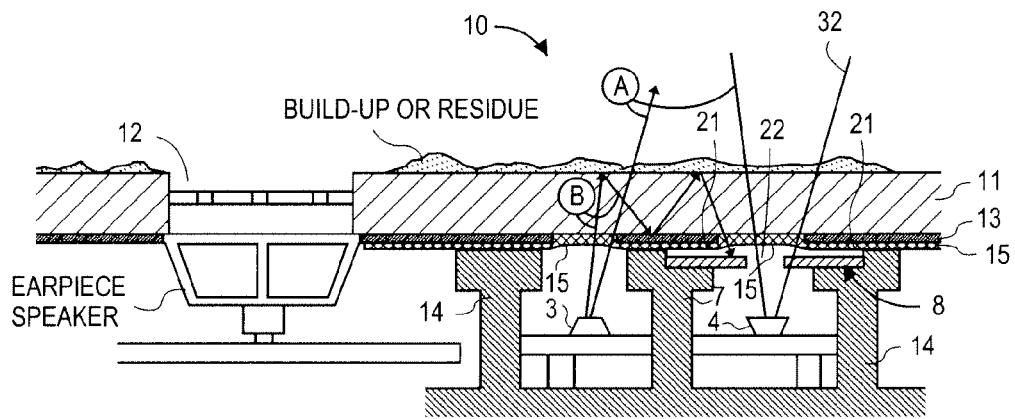
FIG. 3 is a sectional view along the line A, A' of FIG. 2.
Figure 4:
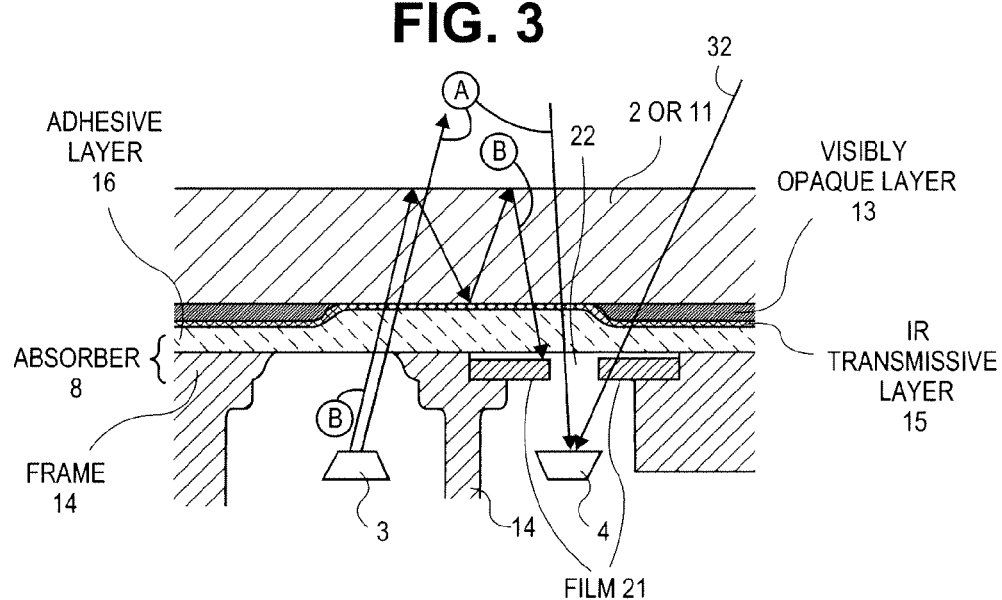
FIG. 4 is a sectional view of the proximity sensor arrangement, according to another embodiment of the invention.

Integrated sensor 1 includes proximity IR emitter 3, which emits the proximity radiation (here, IR light rays, such as IR light "A" and "B" shown in FIGS. 1A and 3-4) and detector 4, which is designed to detect impinging radiation, such as reflections of the emitted IR (e.g., IR light "A" reflected by object 26 as shown in FIGS. 1A-B and 3-4) and visible light (e.g., light 32 and 33 shown in FIGS. 1A and 3-4, representing visible ambient light). Sensor 1 may use single detector 4 configured to detect the IR proximity signal from emitter 3 (e.g., after being reflected by an object), and to detect ambient light (e.g., visible light). To do this, sensor 1 may only have or need detector 4 to receive the IR proximity signal and the ambient light. In some embodiments, detector 4 may use a single continuous detector surface of detector 4 to receive and detect the IR proximity signal; and to receive and detect the ambient light. In some cases, detector 4 includes or is a single photodiode, a single phototransistor, a single transistor, or a single semiconductor active device. Thus, detector 4 may not require the cost, space and power needed for separate detectors (e.g., detection receivers or photodiodes) to perform proximity and ambient light detection.

IR cut filter 8 is above detector 4, and has film 21 with hole or opening 22 formed in the film. The film absorbs the emitted IR light but passes visible ambient light, and the opening is over the detector to pass the reflected IR light and visible ambient light. Filter 8 is described in further detail below.

Radiation passing layer 2 (e.g., a cover) separates an interior region of the device (e.g., having sensor 1) from the outside where an external object 26 is located nearby. The radiation passing layer may be a cover or a cap which, as described further below, may also be a structural layer (e.g., part of a front facing structural plate) of the device. It may be flat as shown or somewhat curved, e.g. to provide a lens effect to the passing radiation. It may be made of a single material such as glass, ceramic, polycarbonate, or acrylic, or it may be a composite or laminate of several layers of different materials. It may function as a protective barrier, and/or it may have an aesthetic function to provide a certain look from the outside. The radiation passing layer 2 is sufficiently transmissive in the infrared (IR) band and visible light band over emitter 3 and over detector 4, in order to permit the integrated sensor that is located below it to function as intended. An instance of the radiation passing layer 2 is the structural layer 11 described below in connection with FIGS. 2-3.

Between the emitter 3 and the detector 4 is radiation shield 7 that extends upwards to the bottom surface of the radiation passing layer 2, as shown. The shield in this case has a simple solid or polyhedron shape, but alternatively may have a more complex shape such as a T-shape. At its bottom, the radiation shield 7 may be secured to a frame (not shown) or a printed circuit board (not shown) on which the emitter 3 and the detector 4 are also installed. An instance of the shield 7 is the frame member 14 described below in connection with FIG. 2-5.

The shield 7 serves to block stray radiation originating from the emitter 3, i.e. by at least reflecting stray radiation but may also absorb some of it to a limited extent. As seen in FIGS. 1A-B and 3-4, a portion of the shield's top surface could be affixed to the bottom surface of the radiation passing layer 2, and/or an intermittent layer (e.g., an IR radiation isolation strip) below radiation passing layer 2 that forms a seal between shield 7 and layer 2. A different portion of the shield's top surface is affixed to the bottom surface of the IR cut filter 8 (e.g., film 21), e.g. by virtue of being glued or bonded to the bottom of IR cut filter 8. Filter 8 may not be directly attached or fixed to the radiation passing layer 2. In some cases, filter 8 may not be touching or pressed against layer 2, such as shown. In other cases, filter 8 may touch or be pressed against the bottom surface of layer 2. The shield's bottom surface could be affixed a printed circuit board or other substrate or platform on which the proximity sensor is installed. The shield 7 could be a structural wall that can bear a vertical load; alternatively it could just be a fence.

Similarly, a portion of frame member 14's top surface could be affixed to the bottom surface of the radiation passing layer 2, or an intermittent layer below radiation passing layer 2. A different portion of the frame's top surface could be affixed to the bottom surface of the IR cut filter 8 (e.g., film 21), e.g. by virtue of being glued or bonded to the bottom of IR cut filter 8. The bottom surface of frame 14 could be affixed to a printed circuit board or other substrate or platform on which the proximity sensor is installed. IR cut filter 8 may be positioned to provide a radiation seal between itself and a top surface of shield 7 and/or frame 14. The adhesive may prevent gaps between filter 8 and the shield and frame so that any visible or IR light received by the detector must pass through filter 8.

Figure 5:
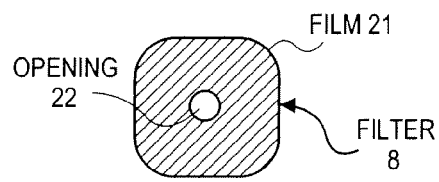
FIG. 5 is a top view of an example IR cut filter.

IR cut filter 8 could be an otherwise continuous layer (e.g., film 21) having one hole (e.g., opening 22) formed therein as shown in the top view of FIG. 5. The Film 22 has a thickness in the vertical direction, and a width and length in the horizontal directions so as to sufficiently reject, reflect and/or absorb stray emitted IR radiation (e.g., IR rays from emitter 3) that has been internally reflected, such as by buildup or residue 27 on the radiation passing layer 2 (which is depicted as a line labeled "B" in the figures, also described as IR light "B"). The internal reflection rays "B" of buildup or residue 27 may begin at the top surface of the radiation passing layer 2 on which buildup or residue 27 exists (on the exterior surface of the electronic device). This build-up or residue may be due to contact with a user's skin during normal use of the device, which may leave an oily film (or may include oil or buildup from a person's ear, finger, breath, etc.) that also catches dust particles, thereby leaving a build-up which may facilitate the undesired IR internal reflections "B" within the radiation passing layer 2. The IR cut filter 8 may be expected to significantly attenuate such undesired IR reflections, without inhibiting the desired reflections, such as those depicted as "A", from reaching the detector 4. In other words, the IR cut filter 8 helps in reducing the stray IR radiation that would otherwise be able to get around the shield 7 via the path "B" as shown (and impinge on the detector 4).

So while the radiation passing cover has a surface exposed to a user's touch such that an oil smudge can develop on the cover over a location between the emitter and the sensor and cause internal reflection of the IR proximity signal, from the emitter towards the sensor, within the radiation passing cover. The film may absorb the internal reflection. This may help the proximity sensor circuitry 5 to operate more accurately when providing a measure of the external object scattered or reflected IR radiation because the internal reflection does not reach detector 4.

More particularly, as seen in FIGS. 1A-B and 3-4, IR cut filter 8 includes film 21 having opening 22 disposed over or above detector 4. The film rejects IR light "B" (e.g., prevents it from passing through the film) but passes visible light 32 to the detector. The opening passes IR "A" and visible 33 light to detector 4. As shown in FIG. 1B, by using filter 8, wider acceptance angle $\theta 2$ (e.g., a view angle) of visible light and a narrower (e.g., smaller) acceptance angle $\theta 1$ (e.g., a view angle) of IR may be received by detector 4.

Only receiving the more narrow angle of IR light provides more accurate and more useful proximity distance measurements, such as between and object and the exterior surface of layer 2 (and detector 4). One reason for the increased accuracy is that the narrower acceptance angle of IR (e.g., emitted IR reflected by an object) allows the detector to detect proximity of an object that may be above the exterior surface of cover 2 of the device (e.g., the surface may include a display and/or touch input), but not detect a wider angle of IR. Thus, the detector and sensor do not detect smudge on the exterior surface of layer 2 or 11, such as buildup or residue 27 that exists over a location between the emitter and the sensor. The smudge reflects emitted IR proximity signal "B" towards the sensor, but the more narrow acceptance angle causes the film 21 to prevent the smudge reflected signal "B" from reaching detector 4 and being detected. However, reflected IR signal "A" does reach the detector and can be detected.

Alternatively, receiving the wider angle $\theta 2$ of visible light at detector 4 provides more accurate and more useful ambient light level measurements, such as of visible light incident upon the exterior surface of layer 2 (and upon detector 4). One reason for the increased accuracy is that the wider angle of visible light acceptance allows the detector to detect a larger overall intensity level, and an average intensity level of the wider angle. For instance the wider angle allows the detector and sensor to distinguish between when the device is held by a user in front of a user's face such as when the user is looking at the display or dialing a phone call, as compared to held up to the user's ear such as when the user is listening to the device or on a phone call. For instance the wider angle also allows the detector and sensor to distinguish between when the device is held in front of a user's face, as compared to held up to the user's ear. When the device is in front of a user's face it may be blocking a light source (e.g., the sun or a light bulb) but allowing light in at wider, peripheral angles, where the light can be detected due to the wider angle. Here the light is not detected at more narrow angles but is detected at wider angles, so the average value may indicate a no touch or non-hover event. When the device is held up to the user's ear and the user's head may be blocking a light source and almost all light even at the wider angles. Here the light is not detected at more narrow angles and is not detected at wider angles, so the average value may indicate a touch or hover event.

It can be appreciated that the more narrow IR acceptance angle $\theta 1$ as compared to visible light angle $\theta 2$ reduces or prohibits IR proximity detection of various smudges and/or other undesired object proximities outside of the more narrow angle. This reduces false detections instead of, or in combination with, a desired IR proximity detection (e.g., at a more narrow acceptance angle). More accurate measurements of proximity distance and/or visible light can provide better determinations as to whether the object is sufficiently close to cause the device to take a predetermined, including, for example, turning off or disabling processing or inputs of a touch screen display that is on the same external face of the housing as the acoustic aperture.

FIG. 1B, shows angle $\theta 1$ formed between the vertical axis AX at the center of detector 4, and the edge of opening 22. It also shows angle $\theta 1$ formed between axis AX, and the edge of shield 7 and/or frame 14. In some embodiments, angles $\theta 1$ and $\theta 2$ may be 48 and 54; or 20 and 60 degrees. In some embodiments, angle $\theta 1$ may be in a range between 20 and 48 degrees; and angle $\theta 2$ may be in a range between 54 and 60 degrees. In some cases wider acceptance angle $\theta 2$ is wider than narrower acceptance angle $\theta 1$ by between 8 and 40 degrees. In some cases, the size of the opening is be the smallest possible needed to properly sense the external object at both a near position (e.g., handset at-the-ear) and far position (e.g., handset away-from-the-ear).

Thus, the opening in the film may define a first view angle $\theta 1$ of the detector for detecting target reflections of the IR proximity signal, and the shield and frame may define a second view angle $\theta 2$ of the sensor for detecting an ambient visible light signal. In some embodiments, angle $\theta 2$ is at least two times larger than angle $\theta 1$. In some embodiments, opening 22 has a size selected so that the sensor receives the IR proximity signal from the emitter when reflected by an object from within predetermined angle $\theta 1$ between an axis AX tangential to the midpoint of the sensor and an edge of opening 22, while film 21 passes visible light to the sensor from between angle $\theta 1$ and the shield 7, and between the angle $\theta 1$ and the frame 14.

Opening 22 in the film may be directly above the detector, such as by having a center of the opening directly above a midpoint of the detector. For example the opening may be centered over central vertical axis AX of detector 4. In some cases, the opening 22 may be slightly off center. Emitter 3 may emit the proximity signal at an angle that is equal in all directions.

The angles for angle $\theta 1$ and $\Theta 2$ may be described by or correspond to diameters of the opening 22 and the opening formed by shield 7 and frame 14. That is the angles are proportional to the diameters of the openings and the distances between the openings and detector 4. Such conversions are know in the art.

For some embodiments, the diameter of circular opening 22 may be 760 microns, the center of detector 4 (e.g., axis AX) may be 403 microns from the edge of opening 22 disposed towards the direction of emitter 3, and the center of detector 4 may be 380 microns from the edges of opening 22 disposed at 90 degrees from the direction of emitter 3. Here, angle $\theta 1$ may be 48 degrees towards and 20 degrees away from emitter 3. Also, in this case, emitter 3 may emit the proximity signal at an angle of 25 degrees from its vertical axis in all directions: and optionally, a distance between the axis of the detector and the emitter may be 2598 microns. In some cases, a wider angle of IR detection may exist to the left of the detector than to the right. This may provide more accurate proximity detection due to the wider angle of IR detection towards the emitter.

According to some embodiments, the shape of opening 22 is shown as circular in FIG. 5. However, in other embodiments it can be another shape, such as a square, a rectangle, an oval, a pentagon, a hexagon, or a square with rounded edges. Here, the edges of the shape are between the minimum and maximum values for angle θ1 described above. Also, the shape of film 21 is shown as a square with rounded edges in FIG. 5. However, in other embodiments it can be another shape, such as a circle, a square, a rectangle, an oval, a pentagon, a hexagon. In addition, the shape of the opening formed by shield 7 and frame 14 over emitter 3 and detector 4 is shown as circular in FIG. 2. However, in other embodiments one or both can be another shape, such as a square, a rectangle, an oval, a pentagon, a hexagon, or a square with rounded edges. Here, the edges of the shape of the opening formed by shield 7 and frame 14 over detector 4 are between the minimum and maximum values for angle θ2 described above.

As noted here, an adhesive may directly attach the bottom surface of IR cut filter 8 to the shield and frame. In some cases, a contact adhesive may be formed around the bottom perimeter surface of film 21, or formed as a blanket layer along the entire bottom surface of film 21. The adhesive may be a layer of pressure sensitive adhesive. In other cases, the adhesive may be formed on the top surface of the shield 7 and frame 14. The adhesive may bond film 21 to the top of the shield and a top surface of one or more of 3 sides of the frame adjacent the sensor. In some cases, the IR cut filter may be a piece of material that need not extend past the shield that separates the adjacent, emitter region.

In some embodiments, the film comprises a radiation absorbing material or layer that absorbs (e.g., filters out or does not pass) 850-900 nano-meter wavelength light and does not absorb (e.g., does not filter out or passes) 400-650 nano-meter wavelength light. In some cases, all wavelengths of ambient and IR light may pass through the opening. The thickness of the film and the adhesive (optionally of only the film) may be 80 microns. Such characteristics may be achieved by a film or sheet that is made of a plastic, a silicon, or a Mylar® material.

According to some embodiments, the IR cut filter may be a piece of material that need not extend past the shield that separates the adjacent, emitter region; the opening in the cut filter is be centered directly above the detector, and in particular along a center axis of the detector; and the size of the opening should be the smallest possible needed to properly sense the external object at both a near position (e.g., handset at-the-ear) and far position (e.g., handset away-from-the-ear).

On the other side of shield 7 from the detector, emitter 3 may be an IR light emitting diode (LED). In some cases, emitter 3 will be an IR LED having a narrow emitted angle (e.g., 5 or 10 degrees greater than acceptance angle θ1) with higher radiation intensity in the narrow angle than a larger angle IR emitter. Thus, although there is a more narrow "viewing" angle of proximity detection, the IR emitted light will travel a longer distance (e.g., through air) and enable longer distance detection of proximity of an object. Also, the view angle may be related to acceptance angle θ1, as well as to the shape, but also the refractive index of the cover 2/11. Denser material (higher refractive index) gives a "less-effective" viewing angle by having a more narrow viewing angle than less dense material. The density of the material of layers between filter 8 and the exterior surface of cover 2/11 may be considered in calculating acceptance angle θ1 external to the device (e.g., a predetermined angle for detecting proximity of an object over the device).

Emitter 3 and the detector 4 have their sensitive surfaces aimed at the radiation passing layer 2, either directly or indirectly (e.g., through a prism or mirror arrangement). Both are controlled and/or sensed electrically by sensor circuitry 5. This combination of the emitter, detector and sensor circuitry may be a microelectronic infrared and visible light sensor unit, e.g. an IR light emitting diode (LED)-based unit with a built-in light collector (lens), analog to digital conversion circuitry, and a digital communication interface to a processor 51 (processor not shown). The processor may be coupled to the sensor and configured to process the passed IR proximity intensity signal when the apparatus is sensing proximity, and process the passed ambient light intensity signal when the apparatus is sensing ambient light. The detector may be part of a shared microelectronic device that can also be used to detect light and in other radiation bands. The data processor may be running proximity and ambient light software that analyzes intensity readings or samples from the sensor circuitry 5, based on proximity signals emitted and detected (as scattered or reflected radiation from the external object) and/or ambient light signals detected. The proximity software may then make a determination as to whether the external object is close, far, or in between.

Detector 4 is able to detect the IR proximity signal from the emitter at the same time as the detector detects visible ambient light. Sensor 1 and/or circuitry 5 may use filter technology to distinguish between the detected proximity signal (e.g., when the apparatus is sensing proximity) and the detected ambient light signal (e.g., when the apparatus is sensing ambient light). Such filter technology may use mechanical filters (e.g., a shutter or a film), software, and/or electronic circuitry. In some cases the filter technology may include time domain filtering, an electrical shutter, a mechanical shutter, frequency band filtering, and the like. The filter technology may switch sensor 1 (e.g., periodically or based on a control signal from the processor) between detection of proximity and detection of ambient light, such as using time domain filtering. In other cases, the filter technology may allow for detection of proximity at the same time as detection of ambient light, such as using frequency band filtering.

Figure 2:
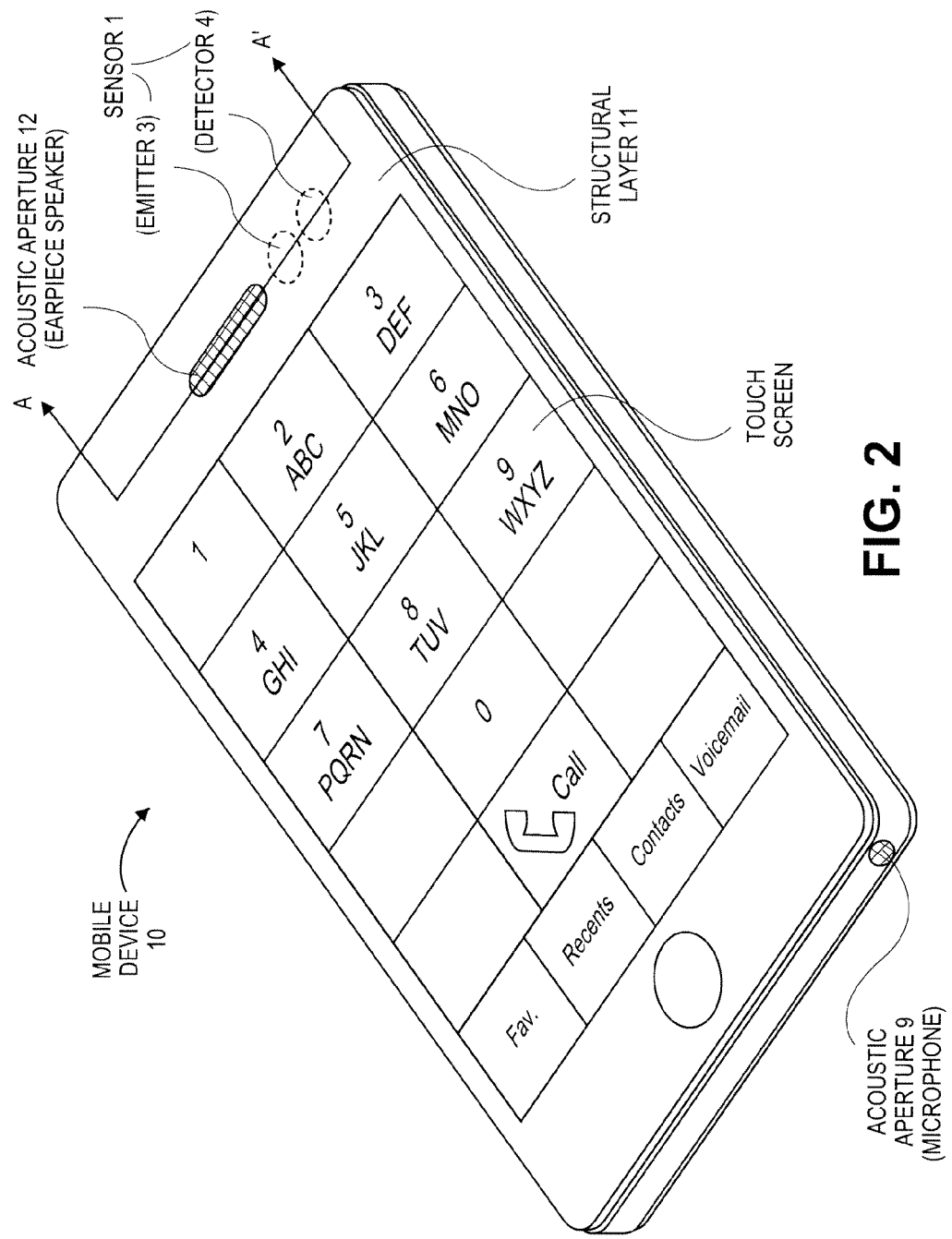
FIG. 2 depicts an example mobile device in which an embodiment of the invention can be implemented.

Turning now to FIG. 2, an example mobile device 10 in which an embodiment of the invention can be implemented is shown. This particular example is a smart phone having an exterior housing that is shaped and sized to be suitable for use as a mobile telephone handset. The mobile device 10 may be a personal wireless communications device that allows two-way real-time conversations (generally referred to as calls) between a near-end user that may be holding the device 10 against her ear, and a far-end user. There is a connection over one or more communications networks between the mobile device 10 and a counterpart device of the far-end user. Such networks may include a wireless cellular network or a wireless local area network as the first segment, and any one or more of several other types of networks such as transmission control protocol/internet protocol (TCP/IP) internetworks and plain old telephone system networks. The near-end user listens to the call using an earpiece speaker located within the housing of the device and that is acoustically coupled to an acoustic aperture 12 formed near the top of the housing. The near-end user's speech may be picked up by a microphone whose acoustic aperture 9 is located near the bottom of the housing. Also included in the housing are conventional electronic components such as an audio codec circuit that interfaces transducers such as the speaker and the microphone with digital audio signal processing components. The audio codec circuitry may also allow the user to listen to the call through a wireless or wired headset that is connected to the handset portion of the mobile device 10. The call may be conducted by establishing a connection through a wireless network, with the help of RF communications circuitry coupled to an antenna that are also integrated in the housing of the device 10.

A user interacts with the mobile device 10 in this case by way of a touch screen that is formed in the front exterior face or surface of the housing. The touch screen may be below the acoustic aperture 12 (earpiece speaker), and above the acoustic aperture 9 (microphone). The touch screen may be an input for the wireless telephony device, adjacent emitter 3 and/or sensor 1. As an alternative, a physical keyboard may be provided together with a display-only screen, as used in earlier cellular phone devices. As another alternative, the housing of the mobile device 10 may have a moveable component, such as a sliding and tilting front panel, or a clamshell structure, instead of the chocolate bar type depicted. FIG. 2 also depicts a graphical user interface of a telephony application program that is running in the device 10 (e.g., stored in non-volatile solid state memory and being executed by an applications processor). The graphical user interface causes a virtual telephone keypad to be displayed as shown, together with related virtual buttons that can be actuated by touch events of the near-end user initiating a call, accessing a stored contacts list of the user, and accessing a voicemail box of the user.

In one instance, the wireless telephony handset (shown here as the mobile device 10) has a structural layer 11 that may be a rigid, visible light transparent plate that begins at the top of the housing as shown and may extend down towards the bottom, forming most of the exterior front face of the housing and acting as a protective cover for the touch screen. Layer 11 may be or may include layer 2 described above. The structural layer 11 is an infrared light passing layer whose top face is part of the exterior face of the housing, and whose bottom face is inside the housing (not shown). In this case, the structural layer 11 also serves as an outer protective layer of the touch screen and is therefore transparent in the visible band as well. Sensor 1 having an infrared emitter 3 and detector 4 both positioned below the bottom face of the structural layer 11, inside the housing, are located directly underneath the locations (e.g., shown by circular apertures formed by shield 7 and frame 14 around emitter 3 and detector 4) indicated by dotted lines in FIG. 2. In the plane defined by the front exterior face of the mobile device 10, these locations are above the virtual telephone keypad that is being displayed by the touch screen, closer to the acoustic aperture 12 (earpiece speaker) than the acoustic aperture 9 (microphone). A sectional view of a relevant region inside housing along the lines A, A' is shown in FIG. 3.

As seen in FIG. 3, the acoustic aperture 12 is formed in the structural layer 11, to the side of a region through which infrared radiation will pass for operation of the sensor. In other embodiments, acoustic aperture 12 may be to the side detector 4, instead of emitter 3. An internal frame member 14 is positioned between the emitter 3 and the detector 4, where the frame member 14 (as an instance of the shield 7, see FIGS. 1-2) serves to block infrared radiation between the emitter and the detector. In addition, the internal frame member 14 may be designed (with the appropriate size and shape, as well as material) to assist in maintaining a rigid overall housing structure, by serving as a weight bearing column or wall, against the bottom surface of the structural layer 11. The frame member 14 extends upwards to the bottom face of the structural layer 11 where it meets a radiation IR cut filter 8 formed between a top surface of the frame member 14 and the bottom surface of the structural layer 11. The frame member extends continuously upward and joins the bottom face of the IR cut filter 8, in order to form a cavity around detector 4 that has no infrared radiation gaps between the bottom surface of the film 21 and the detector, except for opening 22. In this case, the frame member has a T-shaped cross section as shown, where the IR cut filter 8 conforms to the top of the T-shape cross-section. The IR cut filter 8 (as described above in connection with FIGS. 1-2) serves to absorb the internally reflected infrared radiation (originating as rays "B" that would otherwise make their way to the detector 4 as indicated by a dotted line), where such may have been caused by buildup or residue shown on the top face of the structural layer 11. This reduces the amount of stray radiation that impinges on the detector 4, which may increase the accuracy of the proximity sensor. Note that the emitter 3 and the detector 4 have been installed, in this example, on the same microelectronic or printed circuit board carrier, which may be a rigid printed circuit board piece. Other options for installing these components of the proximity sensor within the housing of the mobile device 10 are possible.

In this case, the proximity sensor arrangement, including the IR cut filter 8, has been integrated in the mobile device 10 in such a way as to provide the mobile device 10 with an external look that is uniformly dark. This may be achieved by the following arrangement of layers. A visible light opaque layer 13 (that may have a dark color such as black) is formed in contact with the bottom face of the structural layer 11, with an opening therein aligned with the emitter 3 and another opening aligned with the detector 4. The layer 13 may be a black ink layer (which is opaque or impenetrable in the visible band) that has been deposited or rolled onto the bottom surface of the structural layer 11 and allowed to cure, while the openings have been masked off. This layer 13 gives the exterior face of the device 10 a uniform and dark look from the outside (as the structural layer 11 may be transparent in the visible and IR bands). A purpose of the openings in the layer 13 is to allow visible and infrared radiation to pass, as needed by the sensor, because the black ink layer may not have sufficient transmissivity in the visible or infrared bands.

Next, in some embodiments, an IR transmissive layer 15 that is partially opaque in the visible band is applied to the bottom surface of the layer 13 as shown, also filling the openings therein. The IR transmissive layer 15 may be a film of IR transparent paint (also referred to as IR transmissive paint or ink, e.g. a dark or black ink) that has been deposited or rolled onto the back of bottom face of the structural layer 11. The layer 15 serves to give a uniform appearance to the exterior face of the housing, by hiding the openings that have been formed in the layer 13. Next, the IR cut filter 8 is applied to shield 7 and frame 14 below the IR transmissive layer 15 as shown. Layer 15 may be partially opaque in the visible band to allow sufficient visible light to be received by detector 4 to provide an ALS within angle $\theta 2$ as described herein. In some cases, layer 15 may be totally opaque in the visible band over emitter 3, but partially opaque in the visible band over detector 4. In some cases layer 15 exists over emitter 3, but not over detector 4. In some cases, layer 15 does not exist over emitter 3 or detector 4.

FIG. 4 shows another embodiment of the invention where the IR cut filter 8 is below an infrared and visible light passing adhesive layer 16 (e.g., an optically clear adhesive fluid) in contact with the top face of frame 14 (e.g., a Mylar® sheet patterned as shown in FIG. 4). The adhesive fluid may be an index matching material that reduces differences in index of refraction (within the infrared and visible light bands used by the sensor) between the IR cut filter 8 and the radiation passing layer 2 or structural layer 11. The two holes for emitter 3 and for mounting filter 8 (e.g., forming angle $\theta 2$) may actually be physical holes made only in the frame 14, and not in the infrared passing adhesive layer 16, and are aligned with the locations of the emitter 3 and the detector 4 (which may be directly below these holes). Alternatively, the adhesive layer 16 may be applied only to the top face of the patterned piece (frame 14). The IR cut filter 8 is then pressed against the top surface of the patterned frame 14, to form the arrangement as shown. Note also a difference in this case, relative to the embodiment of FIG. 3, in that there is a single, larger opening formed in the visibly opaque layer 13, which encompasses the emitter and the detector regions as well as the separating region between them. Accordingly, the partially visibly opaque infrared transmissive layer 15 will in this case fill the entirety of such opening as shown, in order to maintain the desired uniform dark look from the exterior. The structure in FIG. 4 may be otherwise the same as that of FIG. 3.

What has been described above is an electronic device having an external housing in which the constituent components of the device are located, a radiation passing layer or structural layer (also referred to here as a cover) that physically protects the electronic components while allowing radiation to pass therethrough, an integrated proximity and ambient light sensor that transmits IR radiation out of the housing and receives and distinguishes detection of emitted IR radiation that has been scattered outside of the housing and ambient visible light, and an IR cut filter that blocks stray IR radiation from the emitter from impinging on the detector portion of the sensor. The IR cut filter film is positioned on or touching the shield in a way that removes IR radiation gaps and serves to take up undesired stray IR radiation, that may be due to internal reflections within cover, such as those caused by smudge on the exterior face of the cover, in order to prevent such from impinging on the detector portion of the sensor. The IR cut filter film allows visible ambient light to pass. The IR cut filter film has an opening centered over the detector in a way that allows IR radiation to pass from within a desired aperture, but absorbs the undesired stray IR radiation. Thus, stray IR light from the emitter that is reflected by smudge left by a user on the cover is rejected by the film and does not reach the sensor to detrimentally effect proximity sensing, such as by interfering with or adding to the target reflected IR proximity signal. A method for manufacturing such an electronic device may proceed as follows.

Referring to FIG. 3 and FIG. 4, a bottom or rear face of a transparent cover or cap (an instance of the structural layer 11 or radiation passing layer 2) is prepared to receive a coat of visibly opaque (dark) paint thereon. One or more paint masks that are located directly above the positions of an emitter and a detector of a proximity sensor are applied to the prepared surface. The dark paint layer is then applied and allowed to cure. The mask is removed thereby exposing the bottom surface of the cover at the sensor apertures, which will be located directly above the emitter and the detector. A partially visibly opaque infrared transmissive layer (e.g., a coat of IR transmissive black ink) is optionally applied to the exposed IR apertures, and is then allowed to cure. Finally, an IR cut filter is applied (e.g., fixed or bonded) as a single film on (e.g., across) the frame over the detector, with an opening that is aligned over the detector. Applying filter 8 may include bonding film 21 onto a location on the frame so that opening 22 is aligned with the detector vertical axis. Such alignment may include microscope indexing during bonding and/or microscope inspection prior to installing the cover over the housing. For instance, an IR and visible light clear adhesive may be applied to a top face of frame 14 that has separate physical openings formed therein for the emitter and the detector, which is then adhered to the transmissive layer 15. Alternatively, the IR and visible light clear adhesive may be applied to the bottom of the cover (over the transmissive layer 15), the IR cut filter is adhered or bonded on the frame over the detector, and then the frame 14 is pressed onto the bottom of the cover against the adhesive. Additional operations may be needed prior to the above or thereafter, before the cover has been completed and is ready to be installed into the housing. At that point, the cover is positioned into the housing, with its apertures and openings aligned to the emitter and the detector locations, and is brought into contact with the top surface of the internal frame member 14. The cover is then fixed in that position and becomes the exterior front face of the housing.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the manufacturing process has been described in connection with the embodiments of FIG. 3 and FIG. 4, a similar process can be gleaned for the embodiment of FIGS. 1-2 in which neither layer 15 nor 16 (and optionally nor layer 13) is necessary. Also, while the drawings depict different layers being in contact with each other (e.g., in FIG. 3, layer 13 is in contact with the bottom of layer 11, and the IR cut filter is in contact with the frame 14), this does not preclude an additional or intermediate layer between them so long as the purposes of the radiation seal achieved by the IR cut filter 8, including that of attenuating the stray internal reflections within the layer 11, are not thwarted. The description is thus to be regarded as illustrative instead of limiting.

What is claimed is:

1. An apparatus sense proximity, and to sense ambient light, the apparatus comprising:
   an emitter of an IR proximity signal;
   a detector configured to detect the IR proximity signal from the emitter when the apparatus is sensing proximity, and to detect ambient light when the apparatus is sensing ambient light; and
   an IR cut filter disposed over the detector, the IR cut filter having a film disposed over the detector that rejects IR light but passes visible light to the detector, the IR cut filter having an opening in the film centered over a midpoint of the detector that passes IR and visible light to the detector.

2. The apparatus of claim 1 wherein the film comprises a radiation absorbing layer that absorbs 850-900 nano-meter wavelength light and does not absorb 400-650 nano-meter wavelength light.

3. The apparatus of claim 1 wherein the detector uses a single continuous detector surface or a single photodiode to detect the IR proximity signal from the emitter when the apparatus is sensing proximity, and to detect ambient light when the apparatus is sensing ambient light.

4. The apparatus of claim 1 further comprising:
   a radiation passing cover disposed over the IR cut filter, the cover having a surface exposed to a user's touch such that an oil smudge can develop on the cover over a location between the emitter and the detector, where the smudge can cause internal reflection of the IR proximity signal, from the emitter towards the detector, within the radiation passing cover, wherein the film is to absorb the internal reflection.

5. The apparatus of claim 1, further comprising:
   a radiation shield positioned between the emitter and the detector, and extending to the bottom surface of the IR cut filter; and a frame positioned adjacent the detector, opposite the radiation shield; the frame extending to the bottom surface of the IR cut filter, the IR cut filter positioned over the detector and extending from the radiation shield to the frame.

6. The apparatus of claim 5, wherein the opening in the film defines a first view angle of the detector for detecting target reflections of the IR proximity signal, the shield and frame define a second view angle of the sensor for detecting an ambient visible light signal, and the second view angle is at least two times larger than the first view angle.

7. The apparatus of claim 5 wherein the opening has a size selected no that the detector receives the IR proximity signal from the emitter when reflected from within a first predetermined angle between an axis tangential to the midpoint of the detector and an edge of the opening, wherein the film passes visible light to the detector from angles; 1) between the first angle and the shield, and 2) between the first angle and the frame.

8. The apparatus of claim 4, further comprising a wireless telephony device housing the emitter, detector and IR cut filter; wherein the cover includes a touch screen input for the wireless telephony device, adjacent the emitter and the detector.

9. The apparatus of claim 1, further comprising:
a processor coupled to the detector and configured to process the passed IR proximity signal when the apparatus is sensing proximity, and process the passed ambient light when the apparatus is sensing ambient light.

10. An electronic device comprising:
a radiation passing layer having a top surface and a bottom surface;
an integrated visible light and proximity sensor having a radiation emitter, and a visible light and emitted radiation detector; the emitter and the detector positioned below the radiation passing layer;
a radiation shield positioned between the emitter and the detector, and extending to the bottom surface of the radiation passing layer; and
a radiation absorbing film being a separate piece than and of a different material than the shield; the film the positioned over the detector to re fight but pass visible light to the detector, the radiation absorbing film having an opening centered over a midpoint of the detector that passes IR and visible light to the detector.

11. The device of claim 10 further comprising:
a frame positioned adjacent the detector, opposite the radiation shield, and extending to the bottom surface of the radiation passing layer, the radiation absorbing film being a separate piece and of a different material than the frame, the a radiation absorbing film extending from the radiation shield to the frame.

12. The device of claim 10 wherein the radiation absorbing film is separate from but has been adhered to a top surface of the shield and a top surface of the frame.

13. The device of claim 10 wherein the detector has a single continuous detector surface or a single photodiode, and wherein the opening is directly above a center of the surface or the photodiode.

14. An electronic device comprising:
a wireless telephony handset housing having an infrared light passing layer having a top face that is part of an exterior face of the housing and having a bottom face that is inside the housing;
an integrated visible light and proximity sensor having an infrared emitter, and a visible light and infrared detector; the emitter and the detector positioned below the bottom face of the light passing layer, inside the housing;
an internal frame member surrounding the detector, the frame member to block infrared radiation between the emitter and the detector; and
an IR cut filter between a top surface of the frame member and the bottom surface of the light passing layer, the IR cut filter having a film disposed over the detector that rejects IR light but passes visible light to the detector, the IR cut filter having an opening in the film centered directly over the detector that passes IR and visible light to the detector.

15. The device of claim 14 wherein the film comprises a radiation absorbing layer that absorbs 850-900 nano-meter wavelength light and does not absorb 400-650 nano-meter wavelength light.

16. The device of claim 14 wherein the detector has a single continuous detector surface or a single or a single photodiode to detect the IR proximity signal from the emitter when the apparatus is sensing proximity, and to detect ambient light when the apparatus is sensing ambient light.

17. The device of claim 14 wherein the film is flat, the frame member has a T-shape, and the filter is over the T-shape.

18. The device of claim 14, the top face having a surface exposed to a user's touch such that an oil smudge can develop on the surface over a location between the emitter and the detector, where the smudge can cause internal reflection of the IR proximity signal, from the emitter towards the detector, within the radiation passing cover, wherein the film is to absorb the internal reflection.

19. The device of claim 14, wherein the opening in the film defines a first view angle of the detector for detecting target reflections of the IR proximity signal, the frame define a second view angle of the sensor for detecting an ambient visible light signal, and the second view angle is at least two times larger than the first view angle.

20. A method for manufacturing an electronic device, comprising:
applying a film across a top surface of a frame member and covering an integrated visible light and IR proximity signal detector, the film rejects IR light but passes visible light to the detector, the film having an opening centered directly over the detector, the passes IR and visible light to the detector; and then
positioning a radiation passing layer into an exterior housing of a mobile device and fixing the radiation passing layer above the film, wherein an internal frame member in the housing lies between a proximity infrared emitter and the detector.

* * * * *